Dec. 20, 1960 J. H. BOLLES ET AL 2,964,774
WINDSHIELD WIPER MECHANISM
Filed June 18, 1952 2 Sheets-Sheet 1

INVENTORS
JULIUS H. BOLLES
ROBERT O. HARTMAN
BROOKS H. SHORT
BY Willett, Hardman and Felix
THEIR ATTORNEYS Dec. 20, 1960   J. H. BOLLES ET AL   2,964,774
WINDSHIELD WIPER MECHANISM
Filed June 18, 1952   2 Sheets-Sheet 2
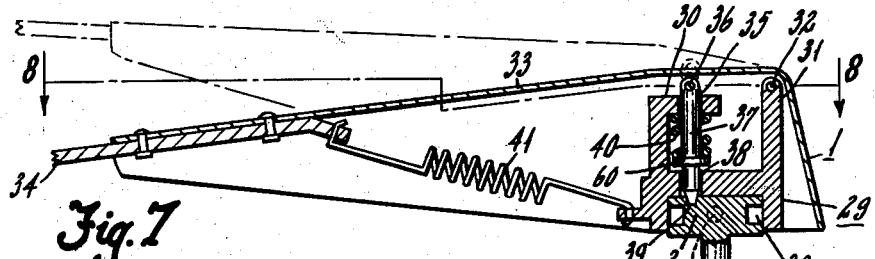
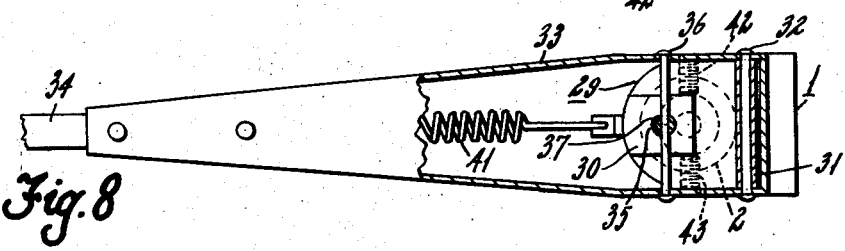
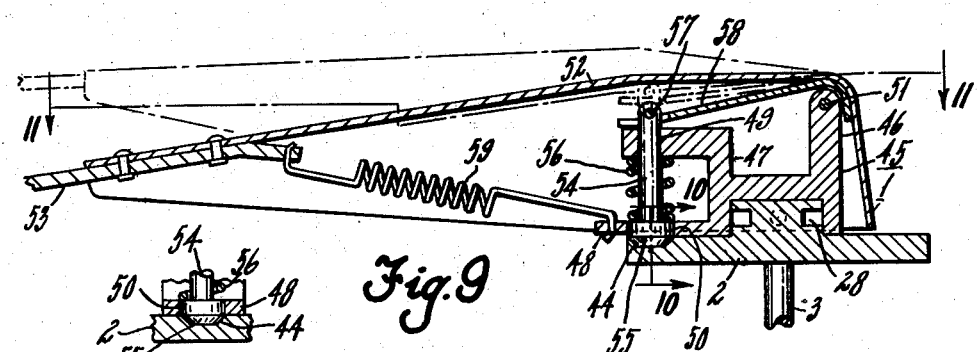
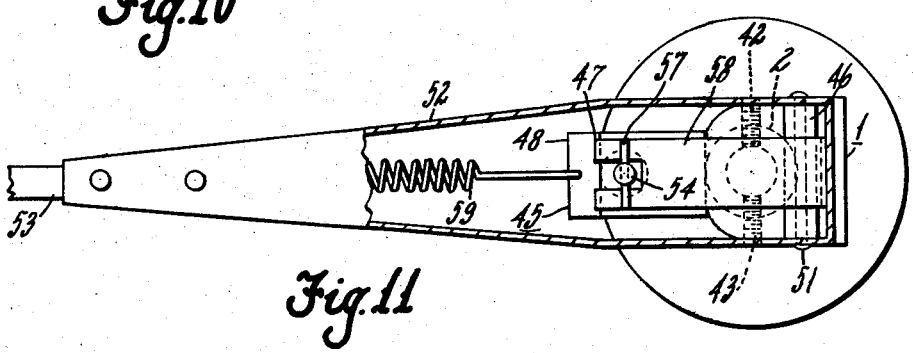
INVENTORS
JULIUS H. BOLLES
ROBERT O. HARTMAN
BROOKS H. SHORT
BY
THEIR ATTORNEYS

United States Patent Office 2,964,774
Patented Dec. 20, 1960

2,964,774

WINDSHIELD WIPER MECHANISM

Julius H. Bolles, Robert O. Hartman, and Brooks H. Short, Anderson, Ind., assignors to General Motors Corporation, Detroit, Mich., a corporation of Delaware Filed June 18, 1952, Ser. No. 294,152

10 Claims. (Cl. 15—250.34)

The present invention relates to windshield wipers and more particularly to clutch mechanisms associated with the wiper arms thereof.

In windshield wipers that are actuated by irreversible drive mechanisms, such as those including worm gears, means must be provided to permit manual movement of the wiper blades. Accordingly, among our objects are the provision of windshield wiper arm assemblies that incorporate means permitting wiper arm movement independent of the drive transmission, and further, the provision of such means that are operative in only one position to assure maintenance of proper wiper blade parking.

The aforementioned and other objects are accomplished in the present invention by providing a clutch mechanism within each wiper arm assembly. Specifically, the clutch mechanisms, or releaseable detent means, are disposed on the exterior of a motor vehicle and are protected from the elements and hidden from view by wiper arm covers. The several modified wiper arm clutches have the common characteristic of being engageable with a wiper arm shaft drive plate in only one position whereby proper blade parking is assured. The various clutch mechanisms are adapted to be released in the same manner, that is, by raising the wiper arm away from the windshield and thereafter rotating the arm in either direction.

Further objects and advantages of the present invention will be apparent from the following description, reference being had to the accompanying drawings, wherein preferred embodiments of the present invention are clearly shown, and wherein similar reference characters refer to similar parts throughout the several views.

In the drawings:

Figs. 5, 7 and 9 are fragmentary, sectional views of wiper arm assemblies showing modified cover structures.

Fig. 8 is a sectional view taken on line 8—8 of Fig. 7.

Fig. 10 is a sectional view taken on line 10—10 of Fig. 9.

Fig. 11 is a sectional view taken on line 11—11 of Fig. 9.

Figure 1:
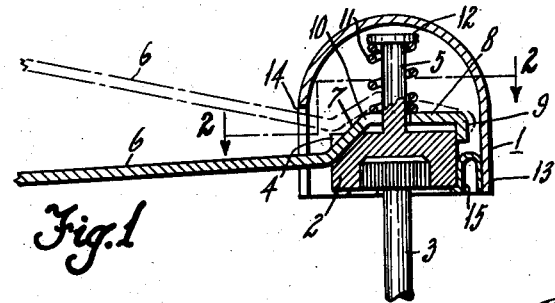
Fig. 1 is a fragmentary, sectional view of a wiper arm assembly showing the preferred form of clutch mechanism.

Referring more particularly to the drawings, in each of the modifications shown, a wiper arm assembly 1 is operatively connected with a drive plate or hub 2 when the clutch mechanisms, to be described, are in the engaged positions. The driving plates 2 are anchored by any suitable means, such as mating serrated parts, to one end of wiper shafts 3. The wiper shafts 3 project through the cowl structure of a motor vehicle, not shown, and transmit oscillatory, or back and forth movement, from a drive transmission to the wiper arm assemblies 1 when the hereinafter described clutch mechanisms are in the engaged position. The wiper arm assemblies 1 and the drive plates 2 are mounted exteriorly on the vehicle.

Figures 2, 3:
Fig. 2 is a sectional view taken on line 2—2 of Fig. 1.
Fig. 3 is a fragmentary, sectional view of a wiper arm assembly showing a modified cover structure.

Referring more particularly to Figs. 1 and 2, the preferred form of clutch mechanism associated with the wiper arm assembly 1 will be described in detail. The drive plate 2 is provided with an inclined slot 4 and is further provided with an axially extending spring guide 5. A wiper arm 6, having attached at one end a wiper blade, not shown, is bent adjacent its other end through an angle of substantially 45° to form an inclined portion 7, reversely bent throughout an angle of substantially 45° to form a flat portion 8, and finally bent throughout an angle of 90° to form a tang portion 9. The portion 8 is provided with a slot 10 which extends into the portion 7. The portion 9 is adapted to engage the circular edge surface of the driving plate 2 while the portion 7 forms a detent that is engageable with the slot 4. The arm 6 is mounted on the drive plate 2 by inserting the spring guide 5 through the slot 10, after which a helical compression spring 11 is positioned on the guide 5 so as to have one of its ends seating on the portion 8 of the blade 6. The spring 11 is retained at its other end by means of an annular flange 12. The entire assembly, including the drive plate 2 and the clutch mechanism which is constituted by the portion 7 of the wiper arm and the slot 4 of the drive plate, is enclosed by a cup-shaped cover 13. One side of the cover 13 is provided with an arcuate slot 14 through which the wiper arm 6 projects. Secured to the inner surface adjacent the open end of the cup-shaped cover 13 and disposed substantially 120° apart are a plurality of U-shaped spring members 15. One leg of the U-shaped spring member 15 is flanged so as to engage the under side of drive plate 2. The three spring members 15 serve as bearing means which rotatably journal the wiper arm assembly upon the drive plate 2.

With the wiper arm 6, shown in the solid line position of Fig. 1, movement will be transmitted from shaft 3 through drive plate 2 by means of the clutch mechanism including slot 4 and portion 7 of the wiper arm, to the wiper arm assembly 1. In order to move the wiper arm assembly 1 relative to the drive plate 2 and its associated shaft 3, the wiper arm 6 must be moved about its pivotal axis which is formed by the end of portion 9, such axis being normal to the axis of the wiper shaft 3. This is accomplished by moving the wiper arm 6 away from its associated windshield, not shown, and thereafter rotating it in either direction to disengage the portion 7 from the slot 4. By reason of there being only one slot in the drive plate 2, proper parking of the associated windshield wiper is assured when the clutch mechanism is in the engaged position. The compression spring 11 performs two functions in that it applies pressure to the blade arm 6 and also maintains the several parts of the blade assembly in engagement with the drive plate 2. When the portion 7 is disengaged from the slot 4 in the drive plate 2, the arm 6 and the cover 13 may be rotated to any position relative to and independently of the drive plate 2 inasmuch as springs 15 merely constitute a bearing surface between the cover 13 and the drive plate 2, and do not wedge the cover 13 against the drive plate so as to preclude relative rotation therebetween.

Referring to Fig. 3, a modified cover 16 and a modified spring guide 17 are shown in combination with the releaseable detent means of the preferred embodiment.

Figure 4:
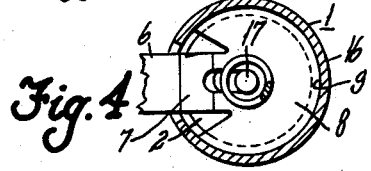
Fig. 4 is a sectional view taken on line 4—4 of Fig. 3.

In this instance, the portion 8 of the wiper arm 6 is of partially circular configuration as is shown in Fig. 4. The portion 9 is sandwiched between the drive plate 2 and the inner surface of the cover 16 while the spring guide 17 is formed as a stop defining the axial position of the cover 16. In this instance, the cover 16 is sprung around the portion 9 of the wiper arm 6. Accordingly, during movement of the arm 6 from the solid to the dash line position in Fig. 3, the cover 16 will move radially to the right by reason of the portion 9 pivoted against the drive plate 2.

Figure 5:
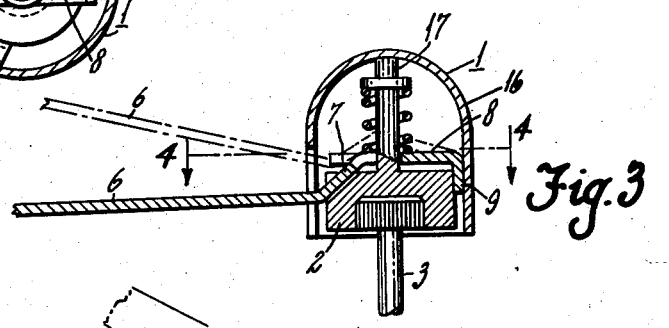
Figure 6:
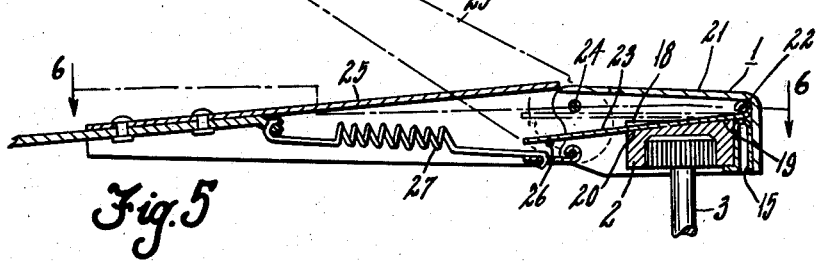
Fig. 6 is a sectional view taken on line 6—6 of Fig. 5.

Referring to Figs. 5 and 6, the wiper arm assembly 1 is shown provided with a modified form of releasable detent means or clutch mechanism. In this instance, the top surface of the drive plate is provided with a diametrically extending channel 18 of varying depth. The edges of the channel adjacent the surface of the drive plate 2 are chamfered and the channel is of varying depth from the end 19 to the end 20 thereof. A resilient cover 21 is sprung around the edge surface of the drive plate 2, additional support being provided by means of U-shaped spring 15 in a manner similar to that shown in Fig. 2. Pivotally mounted within the cover at 22 is a leaf spring 23, which is adapted for engagement with the channel 18 of the drive plate. Pivoted adjacent the other end of the cover 21 at 24 is a wiper arm 25. The wiper arm 25 is provided with a transversely extending pin member 26 which is positioned below the free end of leaf spring 23. In addition the cover 21 supports one end of a tension spring 27, the other end of which is connected to the arm 25 to provide the necessary blade pressure. With the several parts shown in the solid line position of Fig. 5, the releasable detent means including spring 23 and channel 18, are in the engaged position whereby motion may be transmitted from drive shaft 3 to the wiper arm 25. To release the detent means the wiper arm need only be pivoted about axis 24, which movement results in pin 26 raising the leaf spring 23 out of the channel 18, permitting movement of the wiper arm assembly 1 relative to the drive plate 2.

Referring to Figs. 7 and 8, still another modified clutch mechanism is disclosed. In this instance, the drive plate 2 is provided with an annular groove 28. Rotatably supported on the rim portions of the drive plate 2 is a housing 29 having upstanding bracket portions 30 and 31. Within the bracket portion 31 is mounted a pin or trunnion member 32 which pivotally supports a cover 33, which cover is connected to a wiper arm 34 by any suitable means. The bracket 30 is apertured at 35. Mounted within the aperture 35 and connected by means of a pin 36 to the cover 33 is a drive key 37. The other end of the drive key 37 is adapted to be inserted through an aperture 38 of the housing 29 for engagement with a tapered recess 39 in the drive plate 2. A helical compression spring 40 is mounted between the bracket 30 and an annular flange 60 on the drive key 37. One end of a tension spring 41 is anchored to the housing 29, the other end of this spring being attached to the wiper arm 34 for applying blade pressure thereto. The wiper arm assembly including the cover 33 and housing is mounted on the drive plate 2 by means of a pair of diametrically opposed screw devices 42 and 43, the ends of which are adapted to engage the annular groove 28 in the drive plate 2. Thus the entire wiper arm assembly 1 may be removed by withdrawing the ends of the screw devices 42 and 43 from the groove 28. With the wiper arm assembly in the position it is shown in the solid lines of Fig 7, the drive key 37 is maintained in engagement with the tapered recess 39 and the drive plate 2 under the urge of the spring 40 and movement of shaft 3 will be transmitted to the wiper arm assembly 1. To disengage the drive key 37 from the slot 39, it is only necessary to pivot the wiper arm 34 and its associated cover 33 about pin 32, thereby effecting reciprocal movement of the key 37, by reason of the pin 36. After the key has been removed from the recess 39 of the drive plate 2, the wiper blade assembly 1 may be moved relative thereto.

A still further modified form of clutch mechanism is shown in Figs. 9, 10 and 11. In this instance, the drive plate 2 is provided with an enlarged annular flange portion having therein a wedge-shaped slot 44 as is shown in Fig. 10. A housing 45 is rotatably journaled on the drive plate 2, which drive plate is also provided with an annular groove 28. The housing 45 is provided with an upstanding bracket 46 and a pair of axially separated, radially extending bracket portions 47 and 48 which are apertured at 49 and 50, respectively. The bracket portion 46 pivotally supports, by means of a pin 51, a cover 52. The cover 52 is in turn suitably secured to a wiper arm 53. Disposed within the apertures 49 and 50 of the bracket portions 47 and 48, is a drive key 54 having a wedge-shaped end 55 adapted for engagement with the wedge-shaped slot 44 of the drive plate 2. Surrounding the drive key 54 and disposed between the bracket 47 and the wedge-shaped end 55, is a helical compression spring 56 which normally maintains the wedge 55 in engagement with the slot 44. The other end of the drive key 54 is provided with a transversely extending pin 57, the ends of which engage the bifurcated end of a cantilever member 58. The other end of the member 58 is suitably secured to the inner surface of the housing 52. Wiper blade pressure is applied to spring 59, the ends of which are respectively secured to the wiper arm 53 and the housing 45. The entire wiper arm assembly is supported on the drive plate 2 by a pair of diametrically opposed screw devices 42 and 43 in a similar manner as described in connection with Fig. 7. The clutch mechanism disclosed in Figs. 9 to 11 performs dual functions. That is, it can be manually disengaged by pivoting the wiper arm 53 about the pin 51 whereby member 58 will remove the drive key 54 from engagement with the slot 44 to permit relative movement therebetween. However, in addition, by reason of the cooperating wedge-shaped portion 55 and the wedge-shaped slot 44, should an overload condition occur on the wiper arm 53, the clutch mechanism will automatically be disengaged, thereby preventing damage to the drive transmission associated with the wiper arm shaft 3.

It is apparent from the foregoing description, that each of the several modifications provide means for manually moving the wiper arm assembly independent of the drive plate and its associated transmission. Moreover, the clutch mechanisms or releasable detent means are protected from the elements and hidden from view by means of suitable cover assemblies. Accordingly, the exterior appearance of the windshield wiper assembly is not marred.

While the embodiments of the present invention as herein disclosed, constitute preferred forms, it is to be understood that other forms might be adopted.

What is claimed is as follows:

1. In a windshield wiper arm assembly adapted for driving connection with a wiper arm shaft having a drive plate, a wiper arm, a drive plate cover engageable with the wiper arm, means carried by said cover and supporting said cover for unlimited rotary movement relative to said drive plate about the axis of said shaft, manually operable, readily disengageable clutch means for precluding relative rotary movement between the wiper arm and the drive plate at only one relative angular position therebetween, and resilient means engaging said arm for normally maintaining the clutch means engaged.

2. The combination as set forth in claim 1, wherein said cover is sprung around an arcuate portion of said wiper arm.

3. In a windshield wiper, a wiper arm shaft, a drive plate anchored to one end of said shaft, a wiper arm assembly including a wiper arm, manually disengageable clutch means normally interconnecting said arm with said drive plate to establish a driving connection therebetween at only one relative angular position of the arm and the drive plate, said clutch means permitting unlimited rotation of said wiper arm relative to said drive plate about the axis of said shaft in its disengaged position, and resilient means engaging said arm for normally maintaining the clutch means engaged so as to preclude relative rotation between said wiper arm and said drive plate.

4. The combination as set forth in claim 3, wherein said releaseable clutch means includes a notch in said drive plate and an angular portion of said wiper arm.

5. The combination as set forth in claim 3, wherein said releaseable clutch means comprises a tapered channel in said drive plate and a member pivotally attached to said wiper arm assembly.

6. The combination as set forth in claim 3, wherein said releaseable clutch means comprises a tapered recess in said drive plate and a reciprocally mounted drive key adapted for engagement therewith.

7. The combination as set forth in claim 3, wherein said releaseable clutch means includes a wedge-shaped slot in said drive plate and a key having a wedge-shaped end mounted for reciprocal movement within said wiper arm assembly.

8. In a windshield wiper assembly, an actuating shaft, a wiper arm, and means normally interconnecting said shaft and arm to establish a driving connection therebetween at only one relative angular position of the shaft and the arm, said means being constructed and arranged so that upon a predetermined manual movement of said arm relative to said shaft, the driving connection therebetween will be automatically released to permit unlimited relative rotary movement between the shaft and the arm about the axis of said shaft.

9. In a windshield wiper having an actuating shaft and a wiper arm, a hub attached to said shaft, means rotatably journaling said arm on said hub, and means normally interconnecting said arm and said hub to establish a driving connection therebetween at only one relative angular position between the arm and the hub, said last recited means being constructed and arranged so that upon a predetermined manual movement of said arm relative to said hub, the driving connection therebetween will be automatically released to permit unlimited relative rotary movement between said arm and said hub about the axis of said shaft.

10. In a windshield wiper having an actuating shaft and a wiper arm, means normally interconnecting said shaft and said arm to establish a driving connection therebetween at only one relative angular position between the shaft and the arm, and resilient means engaging said arm for maintaining the driving connection between said arm and said shaft, said first recited means being constructed and arranged so that upon manual movement of said arm about an axis substantially normal to the axis of said shaft, the driving connection therebetween will be automatically released to permit unlimited relative rotary movement between said shaft and said arm about the axis of said shaft.

References Cited in the file of this patent

UNITED STATES PATENTS

| | | |
|---|---|---|
| 2,136,909 | Scofield et al. | Nov. 15, 1938 |
| 2,357,280 | Smulski | Aug. 29, 1944 |
| 2,392,670 | Horton | Jan. 8, 1946 |
| 2,452,742 | Franzene | Nov. 2, 1948 |
| 2,493,527 | Carey | Jan. 3, 1950 |
| 2,499,809 | Zaiger | Mar. 7, 1950 |
| 2,528,678 | Anderson | Nov. 7, 1950 |
| 2,715,728 | Krohm | Aug. 16, 1955 |

FOREIGN PATENTS

| | | |
|---|---|---|
| 636,637 | Great Britain | May 3, 1950 |